United States Patent [19]
Yakovlev et al.

[11] 3,916,083
[45] Oct. 28, 1975

[54] METHOD FOR SUPPRESSING GALLOPING IN ELECTRIC TRANSMISSION LINE CONDUCTORS AND CONDUCTOR FOR EFFECTING SAME

[76] Inventors: Leonid Vasilievich Yakovlev, ulitsa Pionorskaya,15; Vyacheslav Mikhailovich Arseniev, poselok Experimentalnoi bazy Orgres, 5, kv. 8., both Khotkovo Zagorskogo raiona Moskovskoi oblasti, U.S.S.R.

[22] Filed: Oct. 16, 1972

[21] Appl. No.: 297,908

[52] U.S. Cl.................................. 174/42; 174/129 R
[51] Int. Cl.² ............................................ H02G 7/14
[58] Field of Search.......... 174/42, 129 R, 128, 130; 57/139, 145, 146, 147, 148

[56] References Cited
UNITED STATES PATENTS

| | | |
|---|---|---|
| 2,215,541 | 9/1940 | Buchanan et al. .................... 174/42 |
| 3,624,276 | 11/1971 | Rawlins et al. ....................... 174/42 |
| 3,659,038 | 4/1972 | Shealy.................................. 174/42 |
| 3,778,527 | 12/1973 | Nigol .................................... 174/42 |

*Primary Examiner*—Laramie E. Askin
*Attorney, Agent, or Firm*—Haseltine, Lake & Waters

[57] ABSTRACT

The present invention relates to the art of electroenergetics, and more particularly to aerial electric transmission lines. Still more particularly, the invention relates to a method for suppressing galloping in aerial conductors and to a span wherein the method is realized.

It is the basic object of the invention to provide a method for suppressing galloping in aerial conductors based on changing the mechanical characteristics thereof and consisting in that the conductor in a span confined by two adjacent towers or poles is divided into at least two portions. Thereafter, the mechanical characteristics of the conductor are altered by displacing the centers of gravity of its cross sections relative to the flexural centers thereof in one direction over one portion and in the opposite direction over the other portion of the span from the vertical plane going through the line of the flexural centers of the conductor cross sections.

According to one of the embodiments of the invention, the span of an electric transmission line comprises a conductor provided with two eccentric weights each rigidly attached to each portion of the span and arranged on either side of the vertical plane passing through the line of the flexural centers of the conductor cross sections at an angle of 40° to 45° to said vertical plane in the gravity direction.

5 Claims, 18 Drawing Figures

METHOD FOR SUPPRESSING GALLOPING IN ELECTRIC TRNSMISSION LINE CONDUCTORS AND CONDUCTOR FOR EFFECTING SAME

The present invention relates to the art of electroenergetics, and more particularly to aerial electric transmission lines. Still more particularly, the invention relates to a method for suppressing galloping in aerial conductors and to a span wherein the method is realized.

So far as is known, by galloping is meant such a state arising in aerial transmission lines, when under certain atmospheric conditions involving of the conductors with masses of ice or snow, as may occur during a sleet storm, said conductors are set in vibratory motion of high amplitude and relatively low frequency. Galloping of conductors is most dangerous to transmission lines and, as a rule, causes serious damage to the line and sometimes even its destruction. Because of its seriousness, this problem has prompted much study and research in the hope of finding practical methods and means for suppressing galloping both in transmission lines newly put into operation and in those which have long been in service. It should be noted here that all these methods somehow or other involve changes in mechanical and/or aerodynamic characteristics of the conductors.

Known in the art is a method for suppressing galloping in a conductor which consists in altering its mechanical characteristics by using heavy weights. Such weights are suspended both on the conductor and between suspension insulator chains on the side of the conductor when the latter is anchored to the transmission tower by means of half-anchors. In essence, the same method for suppressing galloping in a conductor is also realized by apparatus with weights being displaced in the vicinity of insulator chains. This method has proved ineffective and in many cases cannot practically suppress galloping in an electric transmission line conductor.

The apparatus to realize the above method are cumbersome and expensive.

Also known in the art is a method for suppressing galloping in an electric transmission line conductor consisting in changing the mechanical characteristics thereof by increasing its damping decrement inherent in oscillations. For that purpose, a specially designed cable is stranded of a plurality of wires (a multi-conductor cable) so that appreciable friction is achieved between said wires. This method has also proved ineffective owing to a relatively insignificant amount of mechanical energy lost in friction. At the same time, the manufacture of such multi-conductor cables involves additional expenses substantially increasing the cost of the electric transmission line.

Known in the art is still another method for suppressing galloping in conductors of an electric transmission line which consists in changing the aerodynamic characteristics of said conductors by suspending cylindrical or flat fairings thereon. This method, however, has failed to be extensively applied because it involves enormous difficulties in its realization. Besides, the suspension of such fairings on the conductors substantially increases wind-induced loads exerted by said conductors on the towers or poles.

And, finally, known in the art is a method for suppressing galloping in an electric transmission line conductor which consists in changing its mechanical characteristics by damping or modifying the torsional component of the galloping motion (cf. U.S. Pat. No. 2,999,894, Cl. 174-42, issued Sept. 12, 1961).

To realize this method, the conductor in a span between two adjacent supporting towers is provided with inertia devices rotatably mounted on said conductor by means of torsional springs with one end fastened to the inertia device and the other end fastened to the conductor. These springs and suitably mounted inertia devices serve to damp the torsional component of the galloping oscillation of the conductor and to reduce the swing of said conductor, i.e. to partially damp the galloping itself. The above method whereby galloping of the conductor is suppressed by damping its torsional component is more effective as compared to other prior art methods for suppressing galloping in electric transmission line conductors which consists in altering the mechanical characteristics of said conductors. However, this method is not effective enough in suppressing galloping in a number of cases related to the operation of electric transmission lines. Besides, the devices for effecting this method are complicated as far as their manufacture, mounting and adjustment are concerned and, consequently, make the installation and operation of electric transmission lines provided with such devices a labor-and time-consuming affair.

It is a general object of the present invention to provide a new method for suppressing galloping in the conductor of an electric transmission line based on the principle of changing its mechanical characteristics and affording an effective protection to transmission lines against galloping of their conductors by simple and operationally reliable means.

It is a more specific object of this invention to provide said novel method for suppressing galloping in the conductor of an electric transmission line based on the principle of changing its mechanical characteristics due to displacing the centers of gravity of the conductor cross sections relative to the flexural centers thereof and a span of the transmission line permitting of realizing this method by simplest possible means.

This is achieved by that according to the invention the conductor in a span between two adjacent towers or poles is divided into at least two portions whereupon the mechanical characteristics of said conductor are altered by way of displacing the centers of gravity of the conductor cross sections relative to the flexural centers thereof in one direction over one portion of the span and in the opposite direction over the other portion of the span from the vertical plane going through the line of the flexural centers of the conductor cross sections.

It is expedient to displace the centers of gravity of the conductor cross sections relative to the flexural centers thereof by means of weights rigidly fixed to the respective portions of the conductor and disposed so that their centers of gravity be shifted with respect to the flexural centers of the conductor cross sections, said weights being placed on either side of the vertical plane going through the line of the flexural centers of the conductor cross sections.

It is also expedient, after fixing the weights, to twist the conductor clockwise over one portion and anticlockwise over the other portion by rotating the weights round the conductor by a number of revolutions till they are positioned at such an angle to the vertical plane going through the line of the conductor flexural centers whereat the torque induced by the weights will be no less than the torque eventual in the conductor when it is coated with sleet.

The best way would be to rotate the weights round the conductor till they are arranged at an angle of 40° to 45° to the vertical plane going through the line of the conductor flexural centers.

It is preferrable to provide the span of an electric transmission line, wherein suppression of conductor galloping will be effected, with a conductor having at least two eccentric weights rigidly fixed thereto in each portion of the span, said weights being disposed on either side of the vertical plane going through the line of the flexural centers of the conductor at an angle of 40° to 45° to said plane in the gravity direction.

The eccentric weights can be made in the form of mallets with clamps for attaching them to the conductor.

The method for suppressing galloping of the conductor in a span between two adjacent towers or poles of an electric transmission line based on the principle of changing the mechanical characteristics of said conductor when, according to the invention, the span is divided into at least two portions whereupon the centers of gravity of the conductor cross sections are displaced relative to the flexural centers thereof in one direction over one portion and in the opposite direction over the other portion from the vertical plane going through the line of the flexural centers of said conductor, can be effected by respectively redistributing the mass of both portions of the conductor with respect to the line of the flexural centers of its cross sections.

To effect this method, a steel-aluminum conductor can be made comprising an aluminum strand, a stranded steel core inside said aluminum strand wherein the mass of both portions of the conductor is redistributed with respect to the line of the flexural centers of its cross sections, and, according to the invention, another stranded steel core with a mass substantially greater than that of the first core due to the fact that it is substantially thicker, the distance between the line of the centers of gravity of one core and that of the second core exceeding the diameter of the second core. Likewise, provided according to the invention is a span of an electric transmission line with steel-aluminum conductors, each conductor comprising an aluminum strand with two stranded steel cores of substantially different masses.

The proposed method for suppressing galloping in electric transmission line conductors provides reliable protection of said lines against galloping under all service conditions. The span of transmission line wherein the above method is realized can be made at a relatively low cost without any serious erection or service problems involved. The technical means for the realization of the above method for suppressing galloping in aerial conductors are easy in manufacture, compact, cheap and highly serviceable.

The invention will now be described in greater detail with reference to an embodiment thereof which is represented in the accompanying drawings, wherein.

To explain the essence of the proposed method for suppressing galloping in electric transmission line conductors, we shall first consider certain phenomena related to the behavior of a conductor in an electric transmission line having no protection whatsoever against galloping.

Figure 1:
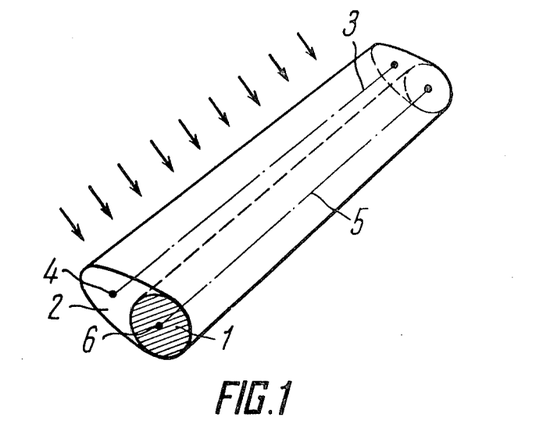
FIG. 1 is a schematic representation of a conductor in the span of an electric transmission line showing its centers of gravity and flexural centers with an indication of the wind direction.

Let us assume that under appropriate atmospheric conditions a conductor 1 (FIG. 1) in the span of an electric transmission line has been covered with sleet 2 as shown in the drawing. In this case, the line 3 of centers of gravity 4 of the cross sections of the conductor 1 coated with sleet 2 is shifted transversely to the entire length of the conductor, to one side from the line 5 of flexural centers 6 thereof (to the left, as shown in the drawing). Let us also assume that in the example under consideration, the wind blows in the direction indicated in the drawing by arrows.

It is known from aerodynamics that any body can be subjected to self-induced oscillations under the following conditions: when the center of gravity of the body is displaced relative to its flexural center, provided the wind blows from the side of the center of gravity; if, in addition to the above two conditions, the body also possesses a positive aerodynamic lift characteristic expressing the incidence dependence of the lift acting upon said body (by incidence is meant the angle between the wind vector and the straight line passing through the center of gravity and the flexural center of the body which line is referred to as "chord"). In this case there may occur self-induced oscillations of very large amplitude and relatively low frequency which, as applied to electric transmission line conductors, are known as "galloping".

To render the phenomena of self-induced oscillations and galloping of a conductor more comprehensible, the effect of friction forces and aerodynamic torque acting on the conductor vibrated by wind are neglected.

For the conductor under consideration (FIG. 1), these conditions are valid at any vertical displacement of the conductor 1 that may take place under the action of an occasional jolt eventual in aerial electric transmission lines. It is self-evident that when the conductor 1 (FIG. 2) is not vertically displaced under the action of any forces, the lift is zero. In this case, the conductor cannot move up or down under the action of wind. However, under actual conditions, one cannot expect that aerial conductors will remain at rest for long. Occasional jolts acting vertically on a conductor are rather frequent and may result in an upward or downward displacement thereof.

Let us assume that under the action of such an occasional jolt, the conductor 1 (FIG. 3) is moved downward. Acted upon by inertia, the center of gravity 4 of the conductor cross section will lag behind the flexural center 6 thereof. The conductor will consequently be twisted clockwise during its downward displacement. At a certain moment the conductor will be displaced from a position I (broken line) to a position II (solid line). Referring to the drawing (FIG. 3), it becomes evident that the angle of incidence $\alpha$ between the wind vector V and the chord 7 is negative. The lift acting on the conductor 1 will, therefore, be negative too. Hence, the conductor 1 will, under the action of wind, also be moved downward as it did under the action of an occasional jolt. So, the lift will, in this case, co-act with the occasional jolt thus accelerating the downward displacement of the conductor and moving it further away from the initial position I.

Figure 4:
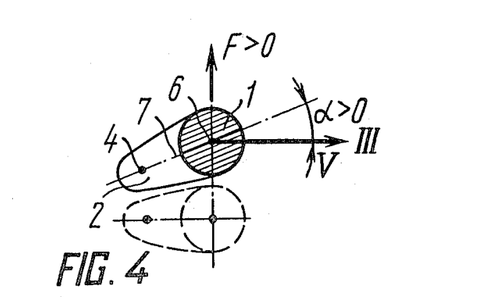
FIG. 4 shows the position of the conductor when it is displaced upward under the action of an occasional jolt.

We shall now consider another case when, under the action of an accasional jolt, the conductor 1 is moved upward (FIG. 4). In this case, the conductor will be twisted anticlockwise due to a lag of the center of gravity 4 of the cross section with respect to the flexural center center 6 thereof caused by inertia. This will cause the conductor to be displaced at a certain moment from its initial position I (broken line) up to a position III (solid line). Referring now to the drawing (FIG. 4), it will be seen that the angle of incidence $\alpha$ between the wind vector and the chord 7 is positive. This fact suggests that the lift acting on the conductor will be positive too. The conductor will, therefore, go upward under the action of wind as it did under the action of an occasional jolt. So, the lift will, in this case, co-act with the occasional jolt thus accelerating the upward displacement of the conductor and moving it further away from the initial position I.

Both above-considered cases indicate that the conductor 1 possessing a positive aerodynamic characteristic, sleet covering said conductor non-uniformly (accretion of sleet, in this case, being on the left side of the conductor as shown in FIGS. 1 to 4) and the wind blowing from the side of the line passing through the centers of gravity of the sleet-coated conductor cross sections (from the left, as shown in FIGS. 1 to 4), the conductor will oscillate in a vertical plane going therethrough with a gradually increasing amplitude finally developing into full galloping.

We now turn to the wind-and-sleet-induced behavior of a conductor under different conditions. Let us assume that according to the basic conditions the line of the centers of gravity is behind that of the flexural centers of the conductor cross sections when the conductor is viewed from the windward side. Such conditions may arise when the sleet coating the conductor accretes on the downwind side.

Now suppose that compared to the above conditions of the conductor 1 (FIG. 1), the wind has reversed its direction (now the wind blows from the right). Evidently, the conductor is not subjected to occasional jolts and is at rest, the incidence is equal to zero as it was in the above case (FIG. 2), the lift is also equal to zero, and, consequently, the conductor cannot be vertically displaced under the action of wind. Still, when it does go up or down under the action of occasional jolts, its wind-induced behavior will sharply differ from what it was when the wind was blowing from the left (FIGS. 1 to 4). If the conductor 1 coated with sleet (FIG. 5) goes down under the action of an occasional jolt, its center of gravity 4 will lag, under inertia, behind the flexural center 6 thereof. The conductor, in this case, will be twisted clockwise. At a certain instant, the conductor 1 coated with sleet will be displaced from its initial position I (broken line) to a position II (solid line). Referring to the drawing (FIG. 5), it will be seen that the angle of incidence $\alpha$ between the wind vector and the chord 7 is positive. This is why the lift acting on the conductor 1 coated with sleet will also be positive and directed upward. The conductor will, therefore, tend to move up under the action of the lift V, i.e. in a direction opposite to that wherein it started moving when acted upon by an occasional jolt. This means that the lift will, in this case, act on the conductor counter the action of the occasional jolt thus slowing down the downward displacement of the conductor and reducing the extent of its departure from the initial position I. If the conductor 1 coated with sleet (FIG. 6) is forced up by an occasional jolt, its center of gravity 4 will, under inertia, lag behind the flexural center thereof. The conductor will now be twisted anticlockwise. At a certain instant of time, the sleet-coated conductor 1 will be displaced from its initial position I (broken line) to a position III (solid line). It will be seen from the drawing (FIG. 6) that the angle of incidence $\alpha$ between the wind vector and the chord 7 is negative. The lift acting on the conductor 1 coated with sleet will also be negative and directed downward. Consequently, the conductor acted upon by the lift will tend to move down, i.e. in a direction opposite to that wherein it started moving under the action of an occasional jolt. So, the lift, in this case, will act on the conductor counter the action of the occasional jolt thus slowing down its upward displacement and reducing the extent of its departure from the initial position I.

Figure 5:
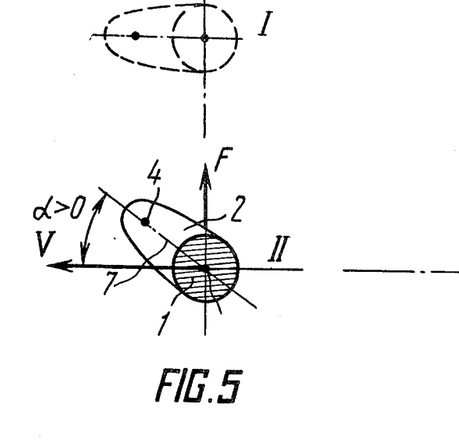
FIG. 5 shows the position of the conductor displaced downward, the wing blowing in a direction opposite to that in FIGS. 1 to 4.
Figure 6:
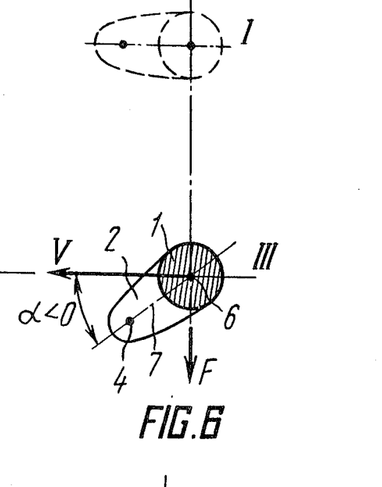
FIG. 6 shows the position of the conductor displaced upward, the wind blowing in a direction opposite to that in FIGS. 1 to 4.

We have established thereby that when the wind reverses its direction from the one shown in FIGS. 1 to 4 to that shown in FIGS. 5 to 6, this results in an effective suppression of any oscillations of the sleet-coated conductor 1 that may occur in the vertical plane under the action of occasional jolts without developing into full galloping.

Evidently, if the conditions of the sleet-coated conductor as shown in FIGS. 1 to 4 change as to the extent of sleet accretion on the conductor rather than to the wind direction, namely if sleet accretes on the left side of the conductor and not on the right side, this will also result in an effective mitigation of any oscillations of the conductor that may occur in the vertical plane. This is accounted for by the fact that the line of the centers of gravity of the conductor cross sections will shift to the right from the flexural centers thereof, and the wind which continues to blow from the left will attack the conductor not on the side of the line of the centers of gravity of its cross sections but on the side of the line of the flexural centers thereof.

Thus, aerial conductors for which no provision is made to protect them against galloping are always exposed to the danger of intensified galloping therein caused by occasional jolts acting on the conductors vertically. The above-considered wind-induced phenomena occurring in conductors coated with sleet indicate that in order to suppress galloping of a conductor in the span of an electric transmission line, various conditions may be set up to develop the lift acting on the conductor over different portions of the span so that under adverse atmospheric conditions, the intensification of galloping over certain portions of the conductor be counterbalanced by the aerodynamic forces developing over the other portions thereof.

Figure 7:
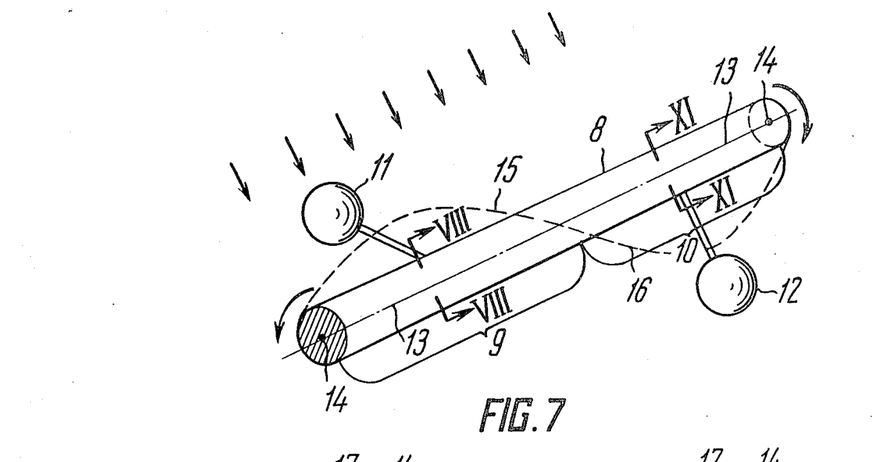
FIG. 7 is a schematic representation of a conductor in the span of an electric transmission line with weights rigidly mounted thereon according to the invention showing its centers of gravity and flexural centers with an indication of the wind direction.

The novel method for suppressing galloping in aerial conductors consists in that a conductor 8 (FIG. 7) is divided into two portions 9 and 10 whereon eccentric weights 11 and 12 are mounted. The eccentric weight 11 is mounted on the portion 9 on one side relative to the vertical plane going through the line 13 of the flexural centers 14 of the conductor cross sections while the eccentric weight 12 is mounted on the portion 10 on the other side of said vertical plane. Owing to this arrangement, the line of the centers of gravity of the conductor cross sections over the first portion 9 will, under the action of the weight 11, shift from the line 13 of the flexural centers 14 of the conductor cross sections in one direction (to the left, according to the drawing), and the line 15 of the centers of gravity of the cross sections of the conductor 8 with the eccentric weight 11 mounted thereon is positioned as shown in the drawing, while the line of the centers of gravity of the conductor cross sections over the first portion 10 will, under the action of the weight 12, shift from the line 13 of the flexural centers 14 of the conductor cross sections in the opposite direction (to the right, according to the drawing), and the line 16 of the centers of gravity of the cross sections of the conductor 8 with the eccentric weight 12 mounted thereon is positioned as shown in the drawing.

When sleet accretes on one side of the conductor, the line of the centers of gravity of the cross sections of the sleet-coated conductor with eccentric weights mounted on the side coated with sleet shifts still further from the line of the flexural centers of the conductor cross sections, while on the opposite side of the conductor, the line of the centers of gravity comes closer to the line of the flexural centers. Let us consider the behavior of each portion of the sleet-coated conductor 8 with the eccentric weight 11 mounted thereon opposite the section VIII—VIII of the first portion 9 and the weight 12 mounted opposite the section XI—XI of the second portion of the conductor. We shall first analyze the wind-induced behavior of the first portion 9 of the conductor 8. The cross section VIII—VIII of this portion of the conductor non-uniformly coated with sleet is shown together with the weight 11 in FIGS. 8 to 10 where one can also see the center of gravity and the flexural center of this cross section. While the portion 9 of the conductor 8 with a sleet coating 17 is at rest (FIG. 8), the incidence is equal to zero as it was in the case illustrated by FIG. 2, the lift is also equal to zero, and, consequently, the conductor will not go up or down when acted upon by wind. If the conductor 8 with the sleet coating 17 goes downward under the action of an occasional jolt, the center of gravity 18 of its cross section will, under inertia, lag, over the first portion thereof, behind the flexural center 14 of its cross section. In this case, the first portion 9 of the conductor 8 will be twisted clockwise. At a certain moment of time, the first portion 9 of the conductor 8 coated with sleet 17 will be displaced from its initial position shown in FIG. 8 to a position shown in FIG. 9. Referring to the drawing, it will be seen that the angle of incidence $\alpha$ between the wind vector and the chord 20 is negative. Therefore, the lift acting on the conductor 8 coated with sleet 17 over its first portion will also be negative and directed downward. The first portion 9 of the conductor 8 will, consequently, move downward under the action of wind as said portion as well as the entire conductor 8 started doing under the action of an occasional jolt. This means that the lift will, in this case, co-act with the occasional jolt on the first portion 9 of the conductor 8 accelerating the displacement of this portion thus making galloping more vigorous.

Figures 8, 9, 10, 11, 12, 13:
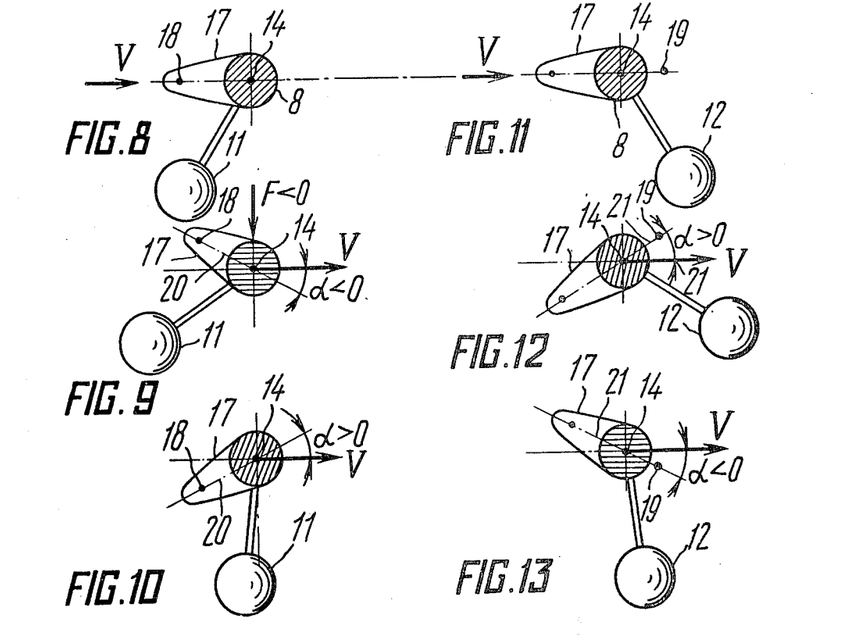
FIG. 8 shows the position of the first portion of the conductor with a weight rigidly mounted thereon and coated with sleet.
FIG. 9 shows the position of the first portion of the conductor displaced downward under the action of an occasional jolt.
FIG. 10 shows the position of the first portion of the conductor with a weight rigidly mounted thereon and coated with sleet displaced upward under the action of an occasional jolt.
FIG. 11 shows the position of the second portion of the conductor with a weight rigidly mounted thereon and coated with sleet.
FIG. 12 shows the position of the second portion of the conductor with a weight rigidly mounted thereon and coated with sleet displaced downward under the action of an occasional jolt.
FIG. 13 shows the position of the second portion of the conductor with a weight rigidly mounted thereon and coated with sleet displaced upward under the action of an occasional jolt.

In case the conductor 8 coated with sleet 17 starts moving upward under the action of an occasional jolt, the center of gravity 18 of its cross section will, over the first portion 9, lag behind flexural center 14 thereof due to inertia. The first portion 9 of the conductor 8 will, in this case, be twisted anticlockwise. At a certain instant of time the first portion 9 of the conductor 8 coated with sleet 17 will be displaced from its initial position shown in FIG. 8 to a position shown in FIG. 10. Referring to the drawing, it will be seen that the angle of incidence between the wind vector and the chord 20 is positive. The lift acting on the conductor 8 with the sleet coating 17 over its first portion 9 will, therefore, be positive too and directed upward. Hence, the first portion 9 of the conductor 8 will, under the action of wind, move upward as it started doing when acted upon by an occasional jolt. So, the lift will, in this case, also co-act with the occasional jolt on the first portion 9 of the conductor 8 accelerating the displacement of this portion, i.e. it will also make galloping more vigorous. The above analysis of the behavior of the first portion 9 of the conductor 8 coated with sleet 17 and loaded with the eccentric weight 11 suggests that at a given wind direction (in our case and as shown in FIG. 8 to 10, from the left), the first portion 9 of the conductor 8, when regarded separately from the second portion 10, remains subjected to galloping almost to the same extent as the conductor 1 considered earlier (FIGS. 1 to 4) which, as we remember, belonged to an electric transmission line unprotected against conductor galloping. It will be seen below, however, that the first portion 9 of said conductor 8, which together with the second portion 10 make up the same conductor one portion being merely an extension of the other, will in no case be induced by the latter into galloping.

We shall now consider the behavior of the second portion 10 of the conductor 8. The cross section XI—XI of this portion of the conductor unevenly coated with sleet 17 with the weight 12 mounted thereon is shown in FIGS. 11 to 13 together with the center of gravity and the flexural center thereof.

Figures 2, 3:
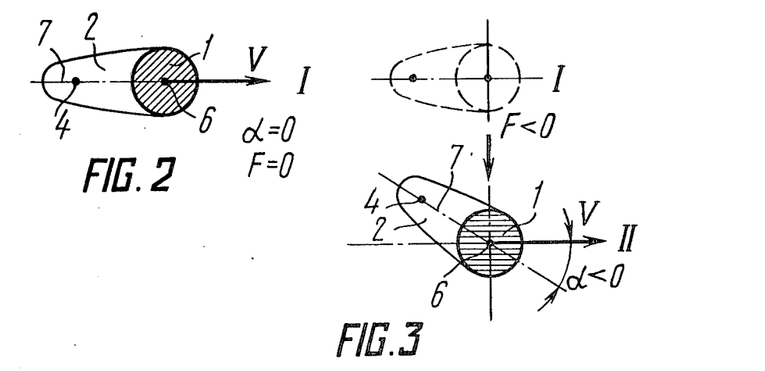
FIG. 2 is a cross sectional view of FIG. 1.
FIG. 3 shows the position of the conductor when it is displaced downward under the action of an occasional jolt.

While the second portion 10 of the conductor 8 coated with sleet 17 is at rest (FIG. 11), the angle of incidence is equal to zero just as it was in the case illustrated by FIG. 2, the lift is also equal to zero, and consequently, the conductor will not be vertically displaced over its second portion when acted upon by wind.

If the conductor 8 coated with sleet 17 is under the action of an occasional jolt, displaced downward, the center of gravity 19 of its cross section in the second portion 10 will lag, under inertia, behind the flexural center 14 thereof. In this case, the second portion 10 of the conductor 8 will be twisted anticlockwise. At a certain instant of time, the second portion 10 of the conductor 8 coated with sleet 17 well be displaced from its initial position shown in FIG. 11 to a position shown in FIG. 12. It will be seen from the drawing that the angle of incidence between the wind vector and the chord 21 is positive. This is why the lift acting on the conductor 8 coated with sleet 17 over its second portion 10 will be positive as well and directed upward. Consequently, the second portion 10 of the conductor 8 will tend to go upward when acted upon by wind in a direction opposite to that in which it started moving under the action of an occasional jolt. Hence, the lift will, in this case, act on the second portion 10 of the conductor 8 counter the occasional jolt thus slowing down the displacement of this portion, i.e. preventing the conductor from galloping. In case the conductor 8 coated with sleet 17 starts, under the action of an occasional jolt, moving upward, the center of gravity 19 of its cross section will lag, over the second portion 10, behind the flexural center 14 of its cross section due to inertia. The second portion 10 of the conductor 8 will, in this case, be twisted clockwise. At a certain instant of time, the second portion 10 of the conductor 8 coated with sleet 17 will be displaced from its initial position shown in FIG. 1 to a position shown in FIG. 13. It will be seen from the drawing that the angle of incidence α between the wind vector and the chord 21 is negative. The lift acting on the conductor 8 coated with sleet 17 over its second portion 10 will, therefore, be negative too and directed downward. Hence, the second portion 10 of the conductor 8 will, under the action of wind, tend to move downward in a direction opposite to that wherein the conductor started moving under the action of an occasional jolt. This means that in this case, too, the lift will act on the second portion 10 of the conductor 8 counter the action of the occasional jolt thus slowing down the displacement of this portion, i.e. preventing the conductor from galloping. It can be seen from the above-considered behavior of the second portion 10 of the conductor 8 coated with sleet and with the eccentric weight 11 mounted thereon that when the wind blows in a particular direction (from the left, as shown in FIGS. 11 to 13), the second portion 10 of the conductor 8 is in no way subjected to galloping. Moreover, as long as the second portion 10 of the conductor 8 is practically an extension of the first portion 9 subjected to galloping, it provides for a mitigation of galloping of the whole conductor 8 under any conditions, as the galloping of the first portion will not develop any further due to the fact that the mechanical energy required to swing the conductor will be absorbed by the second portion 10 of the conductor 8.

It should be emphasized that when the wind direction reverses, the same phenomena will occur as in the case illustrated by FIGS. 7 to 13 with the difference that the conditions preventing the conductor from galloping will be set up for the first portion of the conductor 8 rather than for the second portion. The proposed method for suppressing galloping in electric transmission line conductors has been considered with reference to a specific example of a conductor per phase (unsplit phase) which conductor is divided into two portions. Evidently, each portion may in turn be subdivided into two portions as well, and the resulting four portions may be further subdivided into two portions, etc. In so doing, each portion is provided with an eccentric weight and it is desirable that the weights mounted on two adjacent portions be arranged on each side of the vertical plane going through the line of the flexural centers of the conductor cross sections. For transmission lines with split phases, each phase comprising several conductors separated by interconnected spacers, the proposed method for suppressing galloping in aerial conductors can be applied as advantageously. In this case, each conductor of a split phase should be regarded as an individual conductor in a span of an electric transmission line confined between two adjacent towers or poles and prevention of galloping of said conductor is achieved by the above method and by the means described below.

Figures 14, 15, 18:
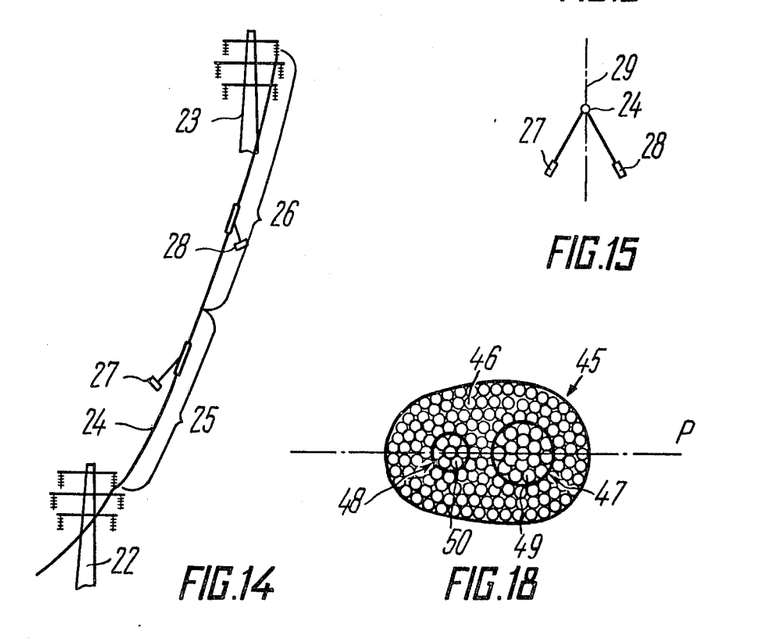
FIG. 14 is a schematic representation of one span of an electric transmission line according to the invention with a conductor having an eccentric weight rigidly mounted on each portion thereof.
FIG. 15 is a frontal view of the conductor in the span as shown in FIG. 14.
FIG. 18 is a sectional view of a steel-aluminum conductor with two stranded cores of different diameters.

FIGS. 14 and 15 show a span of an electric transmission line wherein galloping is suppressed by the above method using eccentric weights mounted on each portion of the conductor. Referring to the drawing, we can see the span between two adjacent towers 22 and 23 of a double-chain high-tension line with only one conductor shown to simplify both the drawing and the description that follows. Nevertheless, all the information pertaining to this particular conductor holds true in its entirety for all the other conductors as well.

Figure 16:
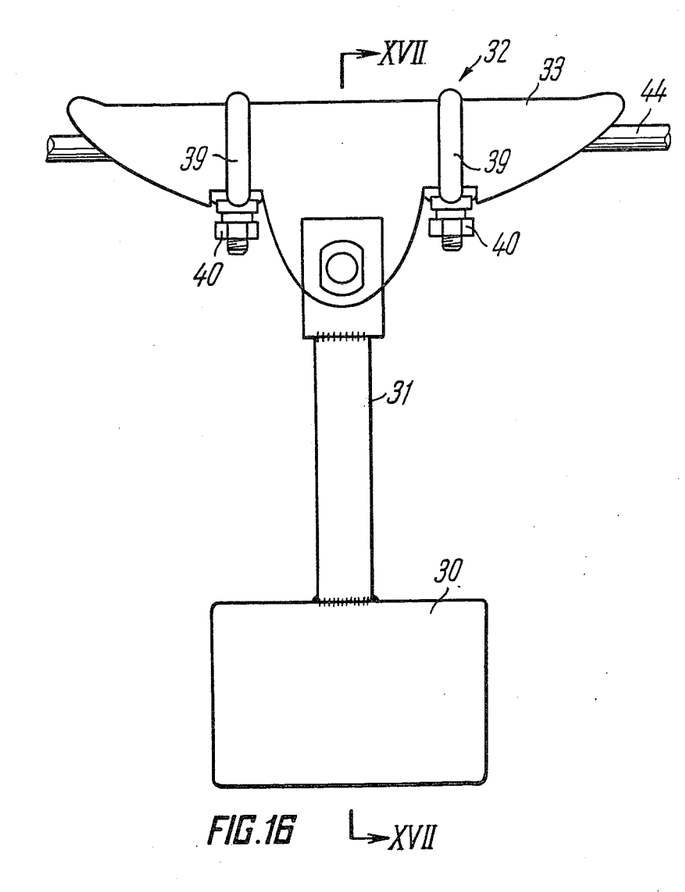
FIG. 16 shows a mallet-shaped eccentric weight mounted on the conductor.
Figure 17:
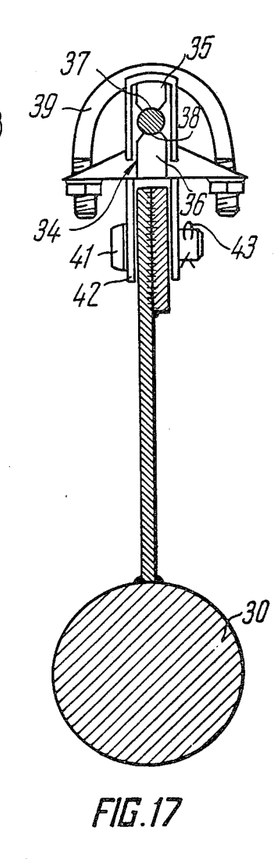
FIG. 17 is a sectional view taken on the line XVII-XVII of FIG. 16.

A conductor 24 is divided into two portions 25 and 26. Mounted on the first portion 25 approximately one third of the span length away from the tower 22 is an eccentric weight 27, while another eccentric weight 28 is mounted on the second portion 26 one third of the span length away from the tower 23. As illustrated in the drawing (FIG. 15), the eccentric weight 27 is mounted on one side of the vertical plane 29 going through the line of the centers of gravity of the cross sections of the conductor 24 (on the left, as shown in the drawing), and the eccentric weight 28 is mounted on the other side of said vertical plane 29 (on the right, as shown in the drawing). The eccentric weights are mounted on the conductor 24 at an angle of 40° to 45° to the vertical plane 29. In most cases, arranging the weights at this angle is most advantageous for a more effective action of these weights on the conductor, a better mitigation of conductor galloping, and to prevent their tipping on the wrong side of the vertical plane 29. In order that the eccentric weights 27 and 28 be set at this particular angle to the vertical plane 29, the conductor 24 is twisted over its first portion 25 several times in one direction by turning the eccentric weight 27 anti-clockwise about the longitudinal axis of the conductor 24 by a number of revolutions, while over the portion 26, the conductor 24 is twisted several times in the opposite direction by turning the eccentric weight 28 clockwise about the longitudinal axis of the conductor by nearly the same number of revolutions. Twisting of the conductor over the portions 25 and 26 by means of the eccentric weights 27 and 28 respectively can be done not only when the conductor is suspended from supporting towers or poles but also when it is spread on the ground before being mounted on the towers or poles. The extent to which the conductor is twisted over each portion depends on the material it is made of, its diameter, the mass of the weight and the length of the span. For example, a steel-aluminum conductor with a section of 150 mm$^2$, suspended in a span 180 to 220 m long having two weights each weighing about 10 kg with their centers of gravity being some 250 mm from the flexural center of the respective conductor cross section, is twisted over each portion, in places where the weights are mounted thereon, by 2 to 3 revolutions. The eccentric weights may be of various shapes: in the form of a rod attached to the conductor by one end, in the form of a rectangular plate attached to the conductor by one of its lateral sides, in the form of any curved body attached to the conductor by the thinner end, etc. Tests performed on transmission lines protected against conductor galloping by using eccentric weights have revealed that the most effective proved to be eccentric weights made in the form of mallets each comprising a shaft attached to the appropriate point of an aerial conductor span portion by one end and a weight fixed to the other end of said shaft. One of such mallet-shaped eccentric weights is shown in FIGS. 16 to 17. It comprises a solid steel cylinder 30 wherein practically the whole mass of the weight is concentrated, a steel shaft 31 welded by one end to the central point of the generatrix of the cylinder, and a clamp 32 intended to attach the eccentric weight to the conductor. The clamp 32 is made detachable in order that the eccentric weight could be suitably attached to any point of the appropriate conductor portion and to facilitate its final adjustment. The main components of the clamp are a clip 33 having a shape suggestive of a canoe wherefore the whole clamp is sometimes referred to as a "canoe clamp" and a bushing 34. The clip and the bushing have respectively lugs 35 and 36 with their ends 37 and 38 forming a cylindrical surface with a radius equal to that of the conductor for which the clamp 32 is designed. The clip 33 and the bushing 34 are linked together when the clamp 32 is attached to the conductor by shackles 39 with nuts 40. The shaft 31 is coupled to the clamp 32 by means of a stud 41 inserted into holes provided on the free end of the shaft and in plates 42 of the bushing 34. The stud proper is secured by a lockpin 43. In order that the eccentric weight under consideration be mounted on a conductor 44, first, the clip 33 is placed on the conductor, then the bushing is introduced into the clip so that the ends 37 and 38 of the lugs 35 and 36 be arranged opposite each other, the shackles 39 are placed on the clip by inserting their threaded ends into the holes in the bushing and, finally, by turning the nuts 40 on these threaded ends the eccentric weight is properly attached to the conductor 44.

The eccentric weight so embodied is easy in manufacture, low in cost, reliable in operation, facile in maintenance and small in size.

The realization of the proposed method for suppressing galloping in electric transmission line conductors by using eccentric weights is characterized in that it can be applied to transmission lines with any conventional conductors. The necessity of providing each span of an electric transmission line with eccentric weights, however, may in some cases prove inconvenient, time-consuming and expensive both in erecting and servicing electric transmission lines. But, as can be seen from the above description of the invention, the novel method may be realized not only by means of eccentric weights, but also by any other appropriate means permitting of displacing the line of the centers of gravity of the conductor cross sections relative to the line of the flexural centers thereof. That is why in certain cases, it may be technically as well as economically more advantageous to suppress galloping in electric transmission line conductors according to the present invention by providing said transmission lines with specially designed conductors wherein the displacement of the line of the centers of gravity of its cross sections relative to the line of the flexural centers thereof is achieved by way of respectively redistributing the mass of the conductor proper. FIG. 18 shows an embodiment of a steel-aluminum conductor. This conductor comprises a core 45 stranded of a plurality of aluminum wires 46. The conductive core encloses two cores 47 and 48 stranded of steel wires 49 and 50 respectively. The diameter of the core 47 considerably exceeds that of the core 48. Consequently, the weight of said core 47 is still greater than that of the core 48 because the weight of each core as with any cylindrical body is proportional to the square of its diameter.

The steel-aluminum conductor under consideration is of elliptical section the cores 47 and 48 being arranged on the major axis thereof one core per focus. Evidently, the more the cores are spaced apart, the more effectively galloping of such a conductor will be suppressed in the span of an electric transmission line. Therefore, in manufacturing the conductor, the cores should be spaced as wide apart, as the design and technological considerations will allow.

When an electric transmission line provided with such a conductor is erected, the conductor should be pretwisted which usually happens spontaneously when an anchored span is being stretched (a span of an electric transmission line between two strain towers), wherein the conductor is rigidly attached to the insulator chains; an anchored span comprises, as a rule, several intermediate spans each disposed between two adjacent intermediate towers. In this case, the line of the centers of gravity of the conductor cross sections will be displaced relative to the lines of the flexural centers thereof over the adjacent portions of the electric transmission line on either side of the vertical plane passing through the line of the flexural centers. Thus, there will be set up conditions essential to suppress galloping in aerial conductors. Obviously, there may be a variety of embodiments of conductors wherein the centers of gravity of the cross sections thereof can be displaced relative to their flexural centers: shaping the conductor to an appropriate form during its manufacture, interwining wires into the conductive core made of a material substantially heavier than the basic material of said stranded core and many others. Basically, the conductor cross section may be shaped to any form.

The novel method for suppressing galloping in aerial conductors has been tested on electric transmission lines operating in those areas where the average rate of icing is equal to about 10 mm, the specific gravity of ice taken as 0.9 g/cm³, and the increased rate of icing is about 20 mm with the same specific gravity of ice.

In one of such areas with an average rate of icing, a 110 kW double-chain transmission line has a tendency to tripping out due to galloping of its conductors and because of that the line was operated, in autumn and in winter, on the principle of so-called "big triangle" when out of six conductors normally used to transmit energy, only three remained in operation: the upper and the lower conductor of one chain and the middle conductor of the other chain. This was done to increase the distance between the conductors so that they do not cross when galloping though, as a result, the transmissive capacity of the line was reduced by nearly one half. When the novel method was applied to this line and 123 spans thereof were provided with eccentric weights mounted on the conductors in the abovedescribed manner (FIGS. 14 and 15), no tripping out due to galloping of conductors was reported with both chains operating. A systematic check of the conductors in the spans provided with eccentric weights has revealed that the conductors were in no way damaged on account of mounting said weights thereon. At the same time, other lines in the same area repeatedly tripped out because of galloping.

In another area with an increased rate of icing, the novel method for suppressing galloping in aerial conductors was tested on a stretch of a 110 kW double-chain transmission line with reinforced concrete towers whereon there were suspended steel-aluminum conductors with a section of 185 mm². Prior to remodelling this stretch, which was 5.2 km long, for the application of the novel method, the conductors in 28 spans thereof, namely from the forty first to the sixty eighth span, were subjected to systematic galloping with the result that the whole transmission line tripped out rather frequently. Because of this, this stretch of the line was operated, in autumn and in winter, on the big triangle principle which, naturally, reduced the transmissive capacity of the line by one half. To prepare the line for the cold season, the spans of the left chain of said stretch between towers 52 and 67 were provided, according to the proposed method for suppressing galloping in aerial conductors, with eccentric weights in the abovedescribed manner (FIGS. 14 and 15). The spans between towers 41 and 52 as well as 67 and 68 of the left chain and the entire right chain were left unprotected against galloping. Thereafter, even at a relatively modest icing of one side of the conductor to 5 to 10 mm and at a wind velocity of 7 to 10 m/sec, there was observed vigorous galloping of the conductors in the unprotected spans between towers 41 and 52 as well as 67 and 68 of the left chain and the spans between towers 41 to 68 of the right chain of said electric transmission line. The conductors in the protected spans of the left chain of said line did not gallop at all.

Besides, the proposed method has been also tested under various conditions on 11 other lines. Thus, comprehensive experimental data obtained from testing the novel method for suppressing galloping in electric transmission line conductors and span of said lines fitted out in accordance with the novel method and means, as well as the experimental operation of said transmission lines have proved the efficacy of the proposed method and means for suppressing galloping in aerial conductors.

What is claimed is:

1. A method for suppressing galloping in an electric transmission line conductor based on altering the mechanical characteristics thereof comprising; dividing said conductor in a span between two adjacent towers or poles of said electric transmission line into at least two portions, displacing the centers of gravity of the conductor cross sections relative to the flexural centers thereof so as to alter the mechanical characteristics of said conductor, displacing the centers of gravity of said conductor cross sections relative to the flexural centers thereof over one portion in one direction from the vertical plane going through the line of the flexural centers of said conductor cross sections and over the other portion in the opposite direction from said vertical plane, said centers of gravity of the conductor cross sections being displaced relative to said flexural centers thereof by means of weights rigidly attached to the respective portions of said conductor and arranged so that their centers of gravity are displaced relative to said line of the flexural centers of said conductor cross sections, and arranging said weights on different portions of said conductor and on either side of said vertical plane going through said line of the flexural centers of said conductor cross sections, and twisting said conductor clockwise over one portion and anticlockwise over the other portion on mounting said weights by turning said weights around said conductor by a number of revolutions in respective directions until said weights are arranged relative to said vertical plane going through said line of the flexural centers of said conductor cross sections at an angle whereby the torque imparted by said weights to said conductor is no less than any torque developed in said conductor as it is being coated with sleet.

2. A method for suppressing galloping as claimed in claim 1 comprising, turning each one of said weights attached to the respective portion of said conductor about said conductor to twist the latter over one portion in a direction opposite to that wherein the conductor is twisted over the other portion until each weight is arranged at an angle of 40° to 45° to said vertical plane going through said line of the flexural centers of said conductor cross sections in the gravity direction.

3. A method for suppressing galloping in an electric transmission line conductor based on altering the mechanical characteristics thereof, comprising the steps of: dividing said conductor in a span between two adjacent towers or poles of the electric transmission line into at least two portions, altering the mechanical characteristics of said conductor by displacing the centers of gravity of the conductor cross-sections relative to the flexural centers thereof over one portion in one direction from the vertical plane passing through the line of the flexural centers of said conductor cross-sections and over the other portion in the opposite direction from said vertical plane, the displacement of said centers of gravity of the conductor cross-sections from the flexural centers of the conductor cross-sections being effected by changing the structure of said conductor.

4. A steel-and-aluminum conductor for an electric power transmission line comprising: a conductive core stranded of aluminum wires; at least two cores stranded of steel wires, there being therefore a first core stranded of steel wires and a second core stranded of steel wires, said second core being substantially heavier and larger in diameter than said first core, both said cores being located inside said conductive core so that the distance between the centers of gravity of their cross sections is greater than the diameter of the second core.

5. A steel-and-aluminum conductor for an electric transmission line as claimed in claim 4, in combination with two adjacent towers or poles; said steel-aluminum conductor being suspended between said towers or poles.

* * * * *